United States Patent
Gemar

[19]

[11] Patent Number: 5,906,091
[45] Date of Patent: May 25, 1999

[54] GRAIN STALK LIFTER

[76] Inventor: Leslie J. Gemar, HC 65 Box 11, Carter, Mont. 59420

[21] Appl. No.: 08/905,239

[22] Filed: Aug. 1, 1997

[51] Int. Cl.⁶ .............................. A01D 57/22; A01D 65/02
[52] U.S. Cl. ................................ 56/119; 56/126; 56/307; 56/312
[58] Field of Search ................................ 56/119, 94, 126, 56/219, 228, 364, 298, 307, 312, 313

[56] References Cited

U.S. PATENT DOCUMENTS

| | | |
|---|---|---|
| 741,314 | 10/1903 | Decay . |
| 1,173,344 | 2/1916 | Dornbach . |
| 1,334,933 | 3/1920 | Hamilton . |
| 1,956,676 | 5/1934 | Gray et al. . |
| 1,979,010 | 10/1934 | Paradise ..................................... 56/313 |
| 2,014,569 | 9/1935 | Huddle ....................................... 56/313 |
| 2,141,299 | 12/1938 | Hume et al. .............................. 56/313 |
| 2,210,219 | 8/1940 | Sievers et al. . |
| 2,317,127 | 4/1943 | Bowling . |
| 2,449,603 | 9/1948 | Hammon . |
| 2,484,704 | 10/1949 | Girodat ..................................... 56/312 |
| 2,576,122 | 11/1951 | Kenison ..................................... 56/312 |
| 2,577,324 | 12/1951 | Goesch ..................................... 56/312 |
| 2,970,420 | 2/1961 | Schmidt . |
| 3,209,526 | 10/1965 | Morrow . |
| 3,753,339 | 8/1973 | Loughead . |
| 4,704,850 | 11/1987 | Obermeier . |

*Primary Examiner*—Terry Lee Melius
*Attorney, Agent, or Firm*—Richard C. Conover

[57] ABSTRACT

A grain stalk lifter attached to a conventional combine for use with grain stalks which are lying down. The grain stalk lifter includes a body having an upper lifting surface extending from a forward end upwards to a rear position above the cutting blades of the combine and further having a forward end provided with a skid for sliding on the ground surface. The body is connected through a spring to the blade guards of the combine to allow the skid to resiliently move upwards from the ground surface.

3 Claims, 4 Drawing Sheets

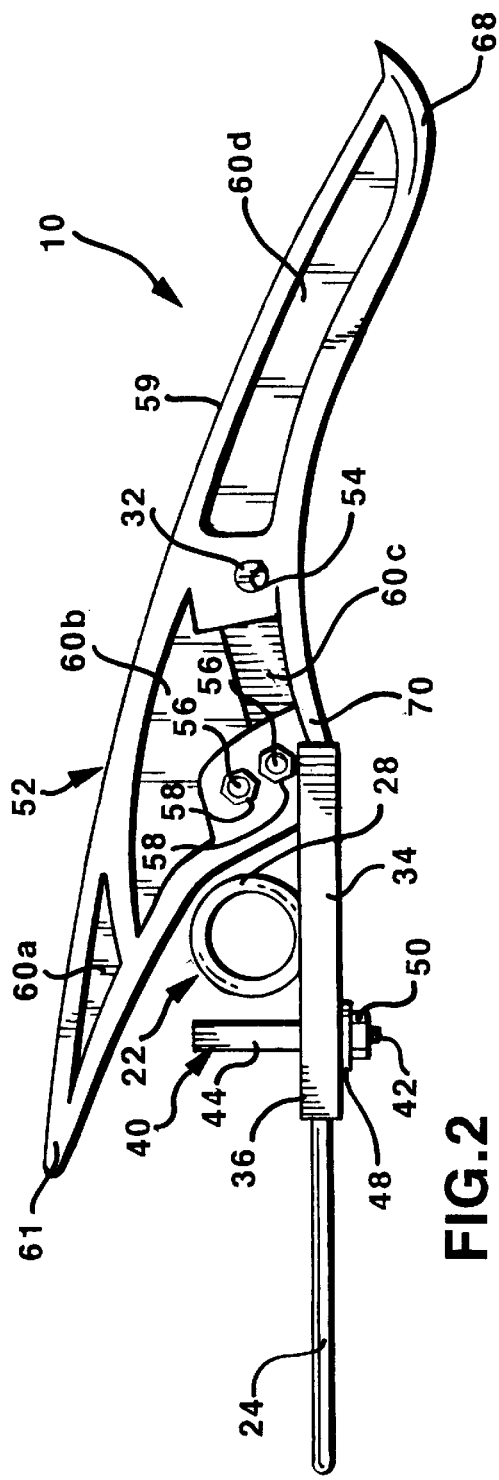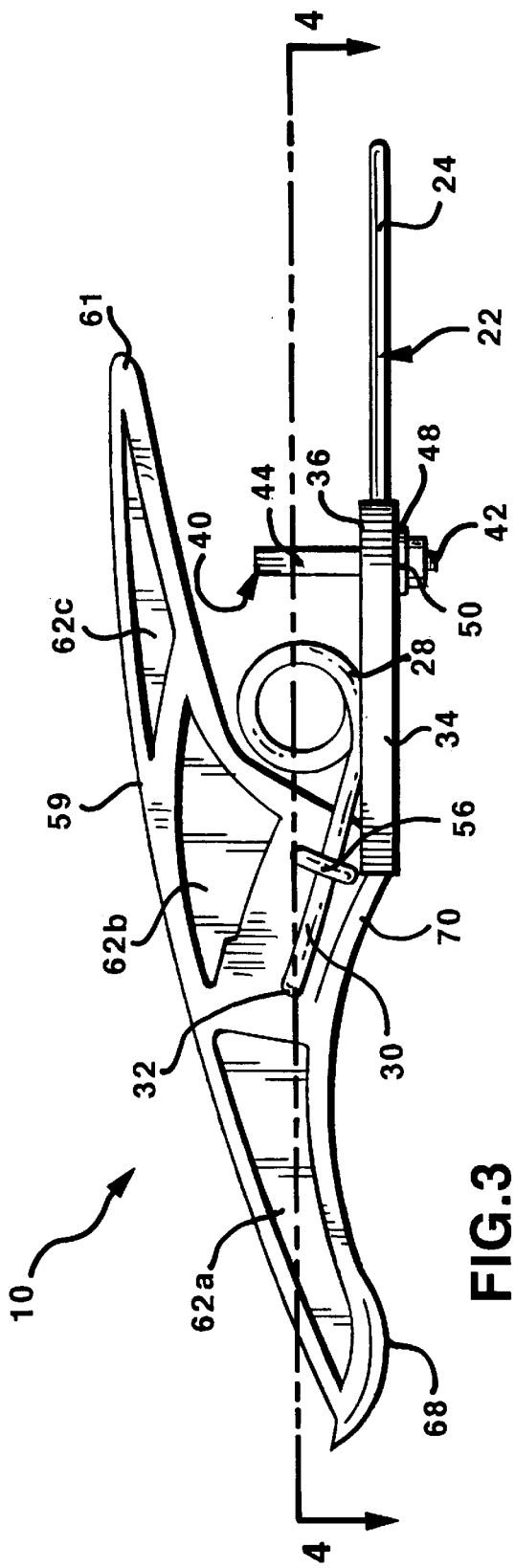

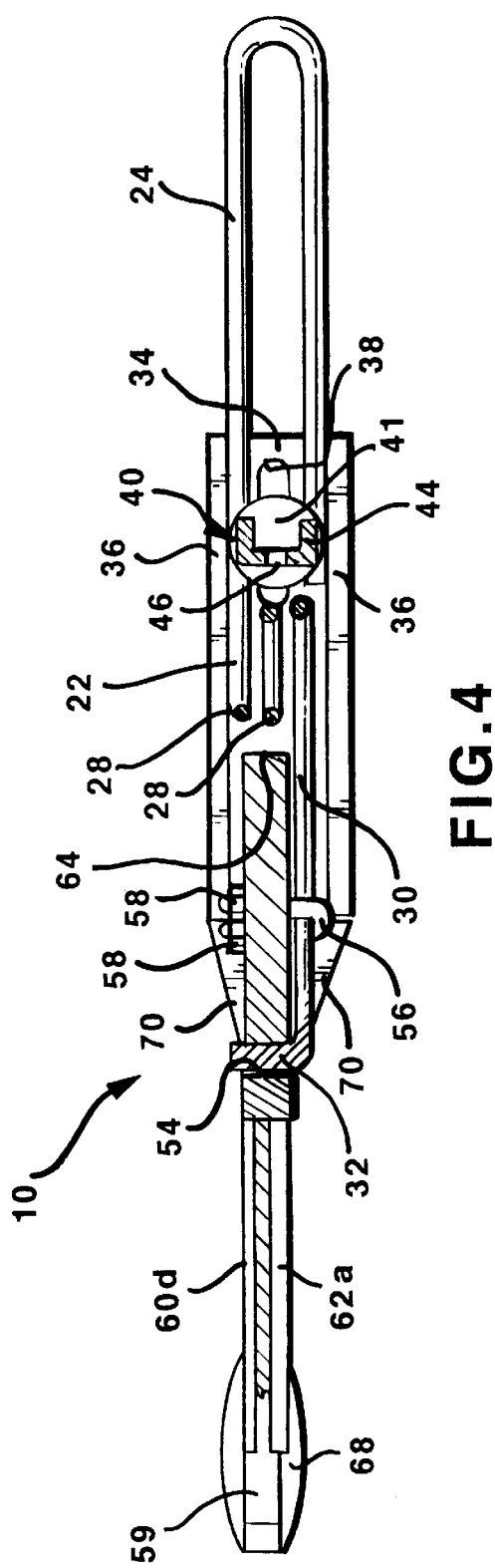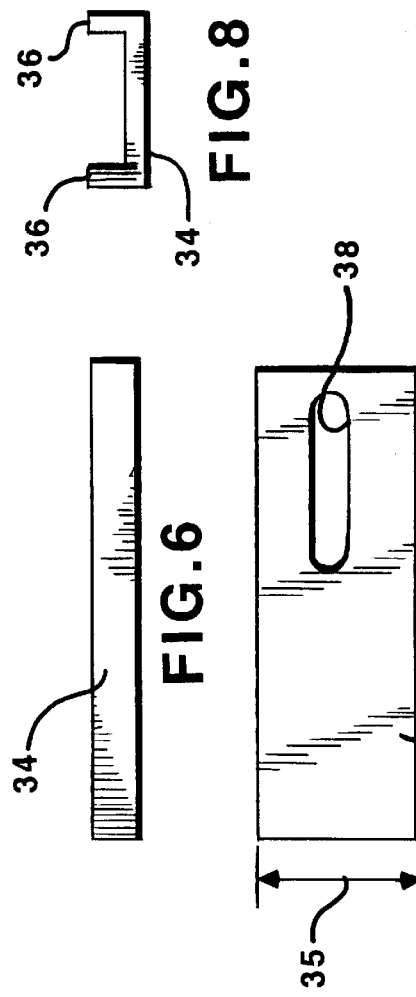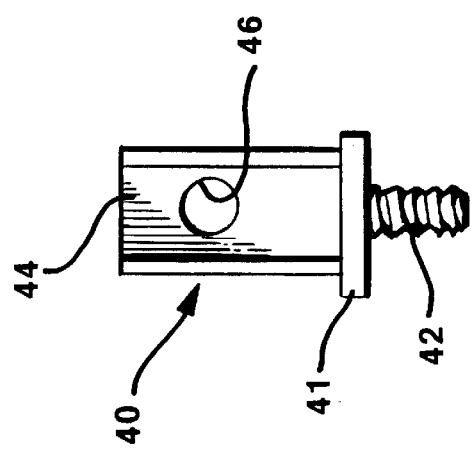

GRAIN STALK LIFTER

BACKGROUND OF THE INVENTION

This invention relates to a grain stalk lifter for use with combines when combining grain stalks which are lying down because of either weather, or insects such as the saw-fly.

Lifters have been known and used for a long time with agricultural machines. The prior art appears to break down into two major categories: those lifters that use only a springy rod for lifting, and those lifters that use a more complicated, manufactured device attached to the harvester.

U.S. Pat. No. 741,314, U.S. Pat. No. 1,956,676, U.S. Pat. No. 3,209,526, and U.S. Pat. No. 4,704,850 are representative of the first category. These patents all use a springy rod to pick up downed agricultural material for harvesting. If the forwardly projecting rod breaks as the harvester moves forward through the fields, there is a very great likelihood that pieces of the broken rod itself will be ingested into the harvester. When this happens with a conventional combine, substantial internal damage to the combine usually occurs. The likelihood of this problem occurring increases as the harvesting speed of a combines increases.

There is another problem associated with all the inventions cited: these inventions are not easily attached to a grain harvesting combine. In each patent cited above, the patent describes devices that were designed to be attached to different types of harvesting equipment.

In the second category, manufactured devices, several patents are representative: for instance see U.S. Pat. No. 2,317,127, U.S. Pat. No. 2,970,420, and U.S. Pat. No. 3,753,339. Again these patents all illustrated devices that project forward of the machine near ground level as the machine moves forward through a field. But they each illustrate a more complicated lifter. The likelihood of ingesting broken lifter parts is just as great as before. But in each case, there are different materials associated with the lifters themselves. Although not generally required by the patents, some of the parts are most easily shaped using metal like iron or steel.

The bigger problem however, is that the devices shown in the '127, and '339 patents could not be attached in a meaningful way to a conventional grain combine. The device shown in the '420 patent might be adapted to fit a grain combine, but this device requires a separate, dedicated, rotating drive shaft positioned below the cutting bar of the combine to operate. This drive shaft drives teeth on a continuous chain, internal to the lifter, so that the teeth move backward at a rate approximately equal to the forward speed of the combine over the field.

Something simpler is needed. All of the lifters cited, since they are facing downward in the direction of motion, have a significant tendency to dig into the ground and break off. Breaking the lifters off is a significant, and expensive, problem. Since a conventional grain combine moves at a few miles per hour while harvesting, any ingested parts broken from the forward facing lifters need to be made of a softer material than spring steel. Such a change can substantially limit the internal damage to the combine. In addition, these new lifters need to be passive devices which can be easily attached, or moved, along the cutting bar of a grain combine for spacing. If moving parts can be eliminated, it is believed that the overall reliability of a new lifting device could be improved substantially over those lifters that require more complex, internal, moving parts. A return to some type of simple, passive device is needed.

SUMMARY OF INVENTION

This invention relates to a grain stalk lifter for use with combines when combining grain stalks which are lying down because of either weather, or insects. Specifically, the grain stalk lifter is a device which is fastened to a conventional combine to: (1) raise low lying grain stalks up into the cutting blades of the combine so these stalks can be cut in the normal manner and (2) break in a fashion which will reduce significant internal damage to the combine.

A conventional combine has a cutting bar that has elongate, stationary, blade guards attached. The elongate blade guards have a pointed end at a forward end and a hole adjacent the opposite, rear, end. Cutting blades oscillate along the cutting bar between the blade guards cutting grain stalks that move into the space between the blade guards and the cutting blades as the combine moves forward.

The grain stalk lifter of the present invention has a body at a front end extending in front of the cutting bar. The body in turn has a forward end, a rear end, and a smooth, upper, lifting surface extending from adjacent the forward end to the rear end. A skid, formed on a side opposite the upper surface at the forward end of the body, either slides along, or rides just above the ground. The rear end of the body extends over and behind the cutting blades so that grain heads, lifted by the upper surface and cut by the cutting blades, will fall onto the continuous belt of the conventional combine.

The body is connected to the cutting bar by using a spring fixedly attached to a blade guard at a first end and fixedly attached to the body at a second end. As a combine moves while harvesting, jostling body movement is thus biased by the spring to return to a normal, relaxed position. The spring attachment at the blade guard requires considerable strength, however, to withstand jolts to the forward-facing body.

At the rear of a blade guard, the first end of the spring is placed below, and clamped, to the rear of the blade guard. For additional strength, a spaced apart fastening at the front of the blade guard is also needed. A steel post, firmly attached to the spring intermediate the ends, has a hole therethrough. The pointed, forward, end of a blade guard is inserted into this hole to hold the spring firmly against the blade guard. These two spaced apart attachments provides for a strong, firm, fastening for that end of a grain stalk lifter that is connected to a blade guard.

In a preferred embodiment, the body is also made of composite nylon (a plastic-like substance), while the spring and its fasteners are made of steel. If a body is broken by striking some object on the ground, it is expected that the composite nylon of the body will break before the spring, or the fasteners holding the spring, since the composite nylon is much softer than the spring material. The broken piece of composite nylon may be ingested into a combine, usually without much damage. But the spring assembly, held by short fasteners at both ends of a blade guard and extending only a short distance forward of the blade guard, will normally stay with the blade guard and not be ingested. This can substantially reduce the expensive, internal damage that might be caused within a combine.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 2 is an elevational view of a grain stalk lifter shown in FIG. 1;

FIG. 3 is a rear elevational view of the grain stalk lifter shown in FIG. 2;

FIG. 4 is a cross-sectional view of the grain stalk lifter taken along the line 4—4 in FIG. 3;

FIG. 5 is an enlarged right side view of a post 40 shown in FIG. 3 with all other parts removed;

FIG. 6 is an elevational view of a base 34 shown in FIG. 3 with all other parts removed;

FIG. 7 is a bottom view of the base shown in FIG. 6;

FIG. 8 is a right side view of the base shown in FIG. 6; and

DESCRIPTION OF A PREFERRED EMBODIMENT

Figure 1:
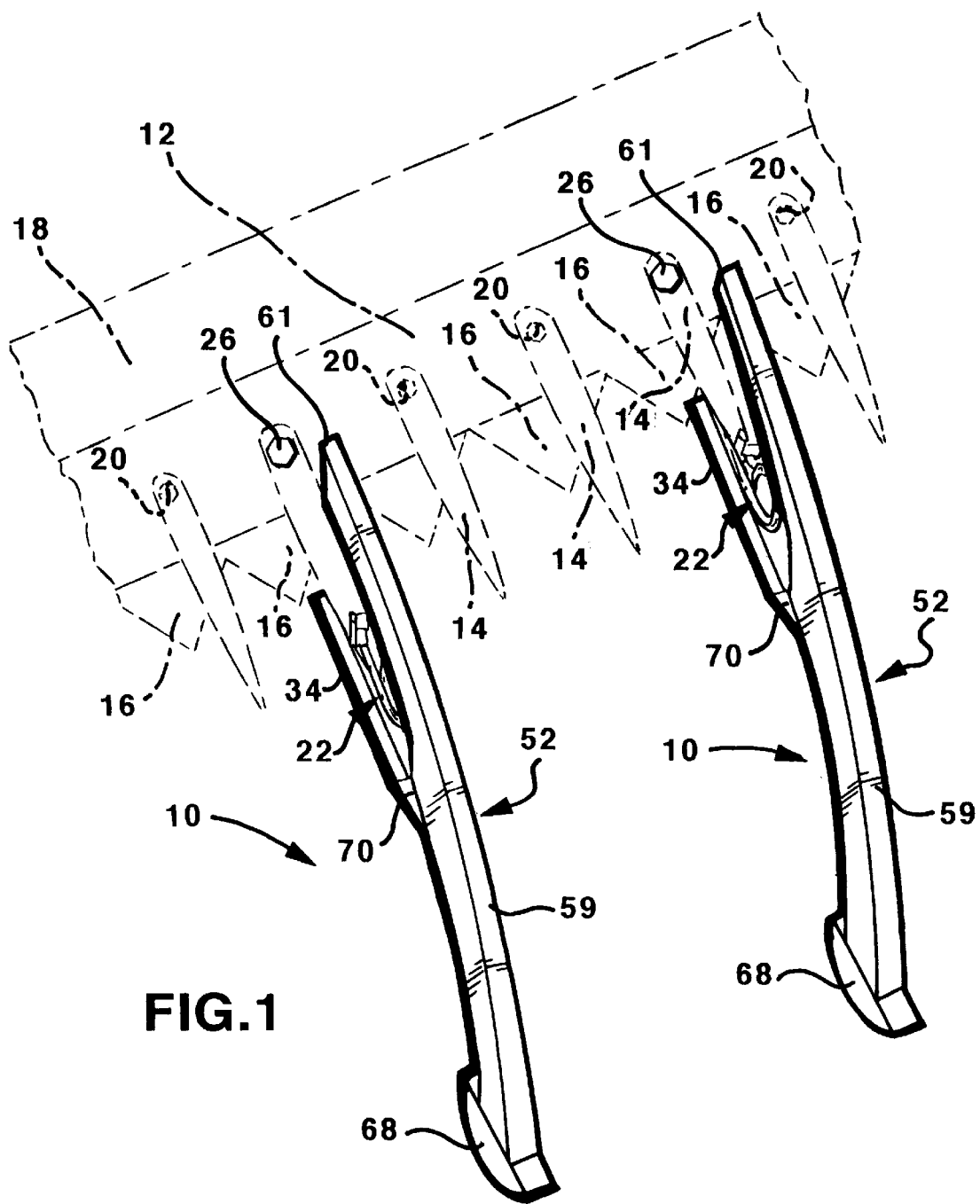
FIG. 1 is an upper perspective view of several grain stalk lifters according to the present invention attached to the cutting bar of a conventional combine.

A preferred embodiment of the grain stalk lifter 10 is shown in FIG. 1 attached to a conventional combine cutting bar 12. Conventional combine cutting bar 12 has stationary blade guards 14 attached to the cutting bar. Blades 16 can oscillate back and forth along the cutting bar between blade guards 14. Oscillating blades 16 cut grain stalks moving in between blades 16 and blade guards 14 as the combine moves forward. The cut grain heads then fall backward onto continuous belt 18 where the grain heads are further moved on into the combine for separating the grain from the chaff. This works satisfactorily for grain that is growing upright because cutting bar 12 is positioned to cut a stalk intermediate the ground and the grain head. Grain head lying close to the ground are to low to be caught and will be skipped by this process.

To pick up these low lying grain heads, grain stalk lifter 10 is attached to cutting bar 12 to extend forward and below it. In a conventional combine, each blade guard 14 has a hole 20 at the rear end which extends through the blade guard and cutting bar 12. Holes 20 can be used to attach grain stalk lifter 10 to a blade guard 14.

Figure 9:
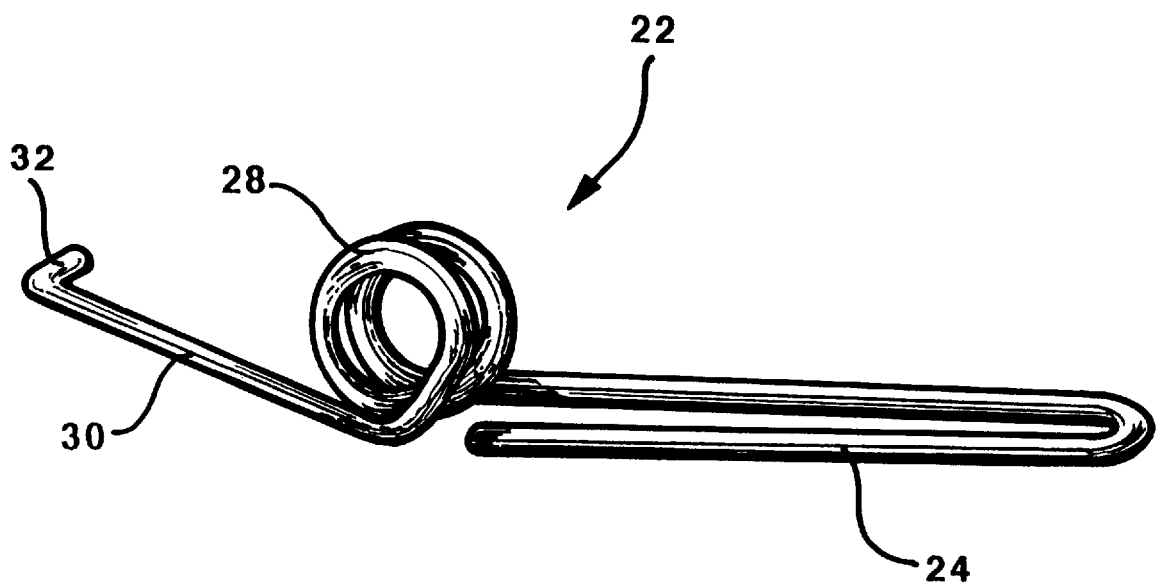
FIG. 9 is a perspective view of a spring 22 as shown in FIG. 3.

Spring 22, having a first and second end, is used to mate grain stalk lifter 10 to a specific blade guard 14 at the first end of the spring. Spring 22, which in the preferred embodiment is continuous rod of spring steel as best seen in FIG. 9, has an elongated "U" loop extension 24 at the first end. "U" loop extension 24 has enough strength and is sized so that the arms of the "U" pass beneath, without riding upward around, a blade guard 14. "U" loop extension 24 is then tightly held against the blade guard by a bolt 26 passing through both hole 20 and loop extension 24. Bolt 26 is held in place by a washer and nut (not shown) with the nut tightly threaded onto bolt 26.

Spring 22 has coils 28 formed so as to be positioned in front of the pointed ends of blade guards 14 when the grain stalk lifter 10 is mounted to a combine. "U" loop extension 24 at the first end of spring 22 extends away from coils 28 in a direction opposite extension 30 at the second end of spring 22, as seen in FIG. 9. Extension 30 terminates in a bent end 32 which is bent substantially perpendicular to extension 30 as best seen in FIG. 4 and 9. Bent end 32 will be used to help secure this second end of the spring to body 52 of grain stalk lifter 10.

Grain stalk lifter 10 also has a base 34 fitted below spring 22 and having a width 35 as shown in FIG. 7. Base 34 has elevated sides 36 which extend above spring 22 when the spring is positioned adjacent the bottom of base 34 as shown in FIGS. 2 and 3. Sides 36 function to keep base 34 aligned with spring 22 as the spring rests between the sides. As best seen in FIG. 7, an elongated slot 38 extends through base 34 adjacent one end.

A post 40, best seen in FIG. 5, has a threaded end 42 at one end, a plate 41 intermediate the ends, and a "U" channel 44 at the other end. In the preferred embodiment, post 40 is made of steel. A hole 46 is provided in "U" channel 44 for receiving the pointed end of a blade guard 14 to provide a second fastening for holding grain stalk lifter 10 in a fixed position relative to the blade guard. Plate 41 is sized to extend over spring 22 on a side opposite base 34, as best seen in FIG. 4, in order that post 40, spring 22, and base 34 can all be clamped together. Threaded end 42 is inserted into slot 38. A washer 48 and nut 50, as best seen in FIGS. 2 and 3, are used to then adjustably tighten post 40 in position. Plate 41 tightly holds base 34 and post 40 against spring 22 at a position where the pointed end of a blade guard 14 extends through hole 46.

With post 40 receiving the pointed end of the blade guard 14 and elongate "U" loop extension 24 bolted to the opposite end of the blade guard, grain stalk lifter 10 can be securely attached, easily and rapidly, to a conventional combine with these two fastenings. Post 40 holds the pointed end of a blade guard 14, base 34, and spring 22 in a fixed relationship. This fixed relationship forms a strong, additional fastening support for spring 22 spaced apart from the clamped first end of the spring at the other end of the blade guard.

A body 52 is attached to the second end of spring 22. Body 52 in the preferred embodiment is made of composite nylon, although other materials could be used equally as well as long as they are as soft and can be molded. A hole 54 in body 52 receives bent end 32 at the second end of spring 22. As best seen in FIGS. 2 and 3, U-bolt 56, spaced apart from bent end 32, extends over extension 30 and through body 52 to hold the extension adjacent body 52. Nuts 58 are used to tighten U-bolt 56 to fixedly hold spring 22 against body 52 even though the body may move relative to the first end of spring 22.

Body 52, as best seen in FIGS. 2, 3, and 4, has indented portions 60a, b, c, and d on one side and indented portions 62a, b, and c on the other side. The unindented width 64 of body 52, as best seen in FIG. 4, is such as to give strength whenever body 52 is given a jolt. Indented portions 60 and 62 decrease the amount of material needed to form body 52.

Body 52, as best seen in FIGS. 2 and 3, on its outside surfaces has a skid 68 at a forward end, a rear end 61 which is raised higher than and extends behind post 40 toward continuous belt 18, and an upper surface 59 which runs from adjacent the forward end to the rear end 61. Upper surface 59 raises grain stalks that are down as the combine moves forward. Skid 68 is elongated slightly so as to extend forward of upper surface 59 as best seen in FIGS. 2–4. Skid 68, which is formed even wider that width 64, gives this "first-contact" portion of body 52 additional strength.

Intermediate the ends of body 52 on the bottom side, a flared portion 70 has a somewhat triangular shape when looked at from either the top or bottom as best seen in FIG. 4. Flared portion 70 streamlines the curve between width 64 of body 52 and width 35 of base 34: the body width being identified in FIGS. 4, the base in FIG. 7. As body 52 moves through grain stalks, flared portion 70 moves the grain stalks away from body 52 so that the grain stalks will not hang up on the forward edge of base 34. Also flared portion 70 abuts the forward edge of base 34 as best seen in FIGS. 2 and 3 so that the base can act as a camming means. Moving camming base 34 forward or rearward changes the elevation of skid 68 above the ground, since camming base 34 restricts rearward movement of flared portion 70 (or downward movement of skid 68) caused by the bias of spring 22.

With this structure as the combine moves forward, skid 68 can slide beneath most grain stalks that are down, the grain stalks will slide along upper surface 59, and blades 16 will cut the grain stalks before the grain heads reach rear end 61.

In operation, grain stalk lifter 10 has hole 46 placed over the pointed end at the front of a blade guard 14. At the rear of blade guard 14, elongate "U" loop extension 24 is place beneath the blade guard and bolt 26 inserted through both hole 20 and elongate "U" loop extension 24 before placing a washer and tightly threading a nut onto bolt 26.

If an adjustment is necessary to tightly hold grain stalk lifter 10 onto blade guard 14, nut 50 is loosened, post 40 moved appropriately in slot 38 so that grain stalk lifter 10 is pressed tightly against blade guard 14. At this time also, if the elevation of skid 68 needs to be changed, camming base 34 can be moved independently of post 40 which can slide in slot 38. When both adjustments are finished, nut 50 is retightened. This operation is repeated for each grain stalk lifter 10 fitted to a blade guard 14 on a combine.

As a conventional combine moves forward in a field, skid 68 will pass under grain stalks that are in front of the skid, but laying down oriented across the line of travel. These grain stalks will ride up on upper surface 59 until the stalks come between oscillating cutting blades 16 and stationary blade guards 14. The grain stalks will then be cut with the heads moving backward on cutting bar 12 until they are picked up by continuous belt 18.

If skid 68 encounters something on the ground, it is shaped to ride over small objects. In this situation, the front portion of body 52 will rise up against the bias of spring 22, and then drop down again at the urging of the spring as soon as the object is passed.

If skid 68 encounters a larger object, body 52 made from composite nylon, may break away from spring 22 since it is made of a softer material. The broken portion of body 52 in this case may be ingested into the combine. But since it is of softer material than spring 22, the likelihood that it will cause somewhat less internal damage to the combine than ingesting the spring is substantial. In most cases, steel spring 22, minus a portion of body 52, will continue to be held by a blade guard 14.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A grain stalk lifting device for moving along a ground surface in front of a conventional combine having elongate blade guards with a pointed end at one end and a hole spaced apart from the pointed end and also with cutting blades positioned between the blade guards, the grain stalk lifting device comprising:

a body having an upper lifting surface extending from a forward end upwardly to a rear position above the cutting blades, the forward end being provided with a skid for sliding on the ground surface; and a resilient means connecting the body to the blade guard for allowing the skid to resiliently move upwardly from the ground surface, the resilient means including a spring having a first extension at one end for securing the spring to the blade guard, and a second extension at an opposite end for securing the spring to the body;

a bolt means extending through the hole in the blade guard for attaching the blade guard to the first extension; and an upright post connected to the first extension in spaced apart relation with the bolt, the post having a hole there through for receiving the pointed end of the blade guard whereby the first extension is secured to the blade guard by the cooperation of the bolt and the pointed end of the blade guard inserted in the hole of the post.

2. The grain stalk lifting device according to claim 1 wherein the body is constructed of composite nylon.

3. The grain stalk lifting device according to claim 1 further including a cam means slidably mounted to the first extension and engaging the body for camming the body upwardly from the ground surface against the bias of the resilient means when the cam means has forced it to the body.

* * * * *